United States Patent
Ravikiran et al.

(10) Patent No.: US 10,440,589 B1
(45) Date of Patent: Oct. 8, 2019

(54) QOS (QUALITY OF SERVICE) BEAMFORMING BY CENTRALLY CONTROLLING REAL-TIME LOCATIONING TO CONTROL BEAMFORMING TRANSMISSIONS FROM ACCESS POINTS INDEPENDENT OF BEAMFORMING CAPABILITY OF STATIONS

(71) Applicant: Fortinet, Inc., Sunnyvale, CA (US)

(72) Inventors: Mahamkali Ravikiran, Bangalore (IN); Lakshmi Narayana Dronadula, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/939,374

(22) Filed: Mar. 29, 2018

(51) Int. Cl.
| | |
|---|---|
| *H04W 16/28* | (2009.01) |
| *H04W 24/02* | (2009.01) |
| *H04B 7/06* | (2006.01) |
| *H04W 28/16* | (2009.01) |
| *H04W 88/08* | (2009.01) |

(52) U.S. Cl.
CPC .......... *H04W 16/28* (2013.01); *H04B 7/0617* (2013.01); *H04W 24/02* (2013.01); *H04W 28/16* (2013.01); *H04W 88/08* (2013.01)

(58) Field of Classification Search
CPC . H04W 16/28; H04W 28/0226; H04W 36/32; H04W 64/00; H04W 64/003; H04W 72/082; H04W 88/08; H04W 88/12; H04B 7/0617
See application file for complete search history.

(56) References Cited

U.S. PATENT DOCUMENTS

| | | | |
|---|---|---|---|
| 10,044,426 B1 * | 8/2018 | Pawar | ................ H04B 7/0617 |
| 2013/0252655 A1 * | 9/2013 | Kim | ................ H04B 7/18513 |
| | | | 455/509 |

* cited by examiner

*Primary Examiner* — Kan Yuen
(74) *Attorney, Agent, or Firm* — Law Office of Dorian Cartwright (57) ABSTRACT

A quality of service is determined for the specific station. Quality of service defines whether the specific station receives beamforming service or not, independent of beamforming capability of the specific station. QoS can be implemented by centrally controlling the locationing for beamforming. The beamforming location information and QoS information are transmitted to an access point servicing the specific station. The access point transmits network packets with beamforming signals to the specific station based on the beamforming location information.

8 Claims, 6 Drawing Sheets

QOS (QUALITY OF SERVICE) BEAMFORMING BY CENTRALLY CONTROLLING REAL-TIME LOCATIONING TO CONTROL BEAMFORMING TRANSMISSIONS FROM ACCESS POINTS INDEPENDENT OF BEAMFORMING CAPABILITY OF STATIONS

FIELD OF THE INVENTION

The invention relates generally to computer networking improvements, and more specifically, to provide beamforming QoS by centrally controlling real-time locationing of stations to control beamforming to stations independent of beamforming capability.

BACKGROUND

Beamforming in a Wi-Fi network occurs during wireless data transfers between transmitters (i.e., a beamformer) and receivers (i.e., a beamformee) such as access points and stations. More specifically, rather than broadcasting a signal to a wide area to reach a target, beamforming concentrates the signal directly at the target that is faster, stronger, and has a longer range, with improved SNR. Beamforming is enabled by transmitters and receivers that use MIMO (multiple-input, multiple-output) technology. Data is sent using multiple antennas to increase throughput and range with propagation over multiple paths. Newer standards such as IEEE 802.11ac and IEEE 802.11ac wave 2 provide particular protocols for beamforming as to how transmitters and receivers communicate with each other and provide information about their relative positions. This will increase the number of beamforming enabled products brought to market.

Problematically, previous standards such as IEEE 802.11n support beamforming capability, but without any specific direction on how it is to be implemented. Consequently, a router or access point may not be compatible with a station having a different implementation and no location information is available for implementing beamforming capability.

Additionally, beamforming has no inherent priority between stations. A CEO or CTO of a company, thus, could receive standard network services from access point in a mostly beamforming station environment.

Therefore, what is needed is a robust technique to provide beamforming QoS by centrally controlling real-time locationing of stations to control beamforming to stations independent of beamforming capability.

SUMMARY

These shortcomings are addressed by the present disclosure of methods, computer program products, and systems for centrally controlling real-time locationing of stations to control beamforming to stations independent of beamforming capability.

In one embodiment, a communication channel is established on the data communication network with the plurality of access points. The plurality of access points provides network access to the plurality of stations.

In another embodiment, location information is organically determined for the plurality of stations from the plurality of access points. The station location information for a specific station determined by a signal strength of a signal (RSSI) as received by different access points at known locations.

In still another embodiment, a quality of service is determined for the specific station. Quality of service determines whether the specific station receives beamforming service or not, independent of beamforming capability of the specific station. QoS can be implemented by centrally controlling the locationing for beamforming. The beamforming location information and QoS information are transmitted to an access point servicing the specific station. The access point transmits network packets with beamforming signals to the specific station based on the beamforming location information.

Advantageously, beamforming resources are optimized for better access point device performance. Moreover, quality of service is provided to beamforming.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for centrally controlling real-time locationing of stations to control beamforming to stations independent of beamforming capability.

A novel control layer for beamforming from a network perspective supersede device-initiated beamforming controls. Moreover, the control layer is centralized, thereby leveraging access to access points utilized as location sensors around an environment. A central locationing server, as a result, can orchestrate beamforming on a per-station basis around a network at various access points. In some cases, beamforming control is based at least in part on network conditions as a whole. Thus, network congestion on one part of the network requiring load balancing, may result in reduced beamforming output from an access point in a different part of the network in order to facilitate load-balancing. One of ordinary skill in the art will recognize that many other scenarios are possible, given the present disclosure, as discussed in more detail below.

As referred to herein, beamforming generally concerns a focus of antenna from an array of antenna into a certain direction, in a constructive manner, to form a stronger direction signal relative to an omnidirectional signal.

Figure 1:
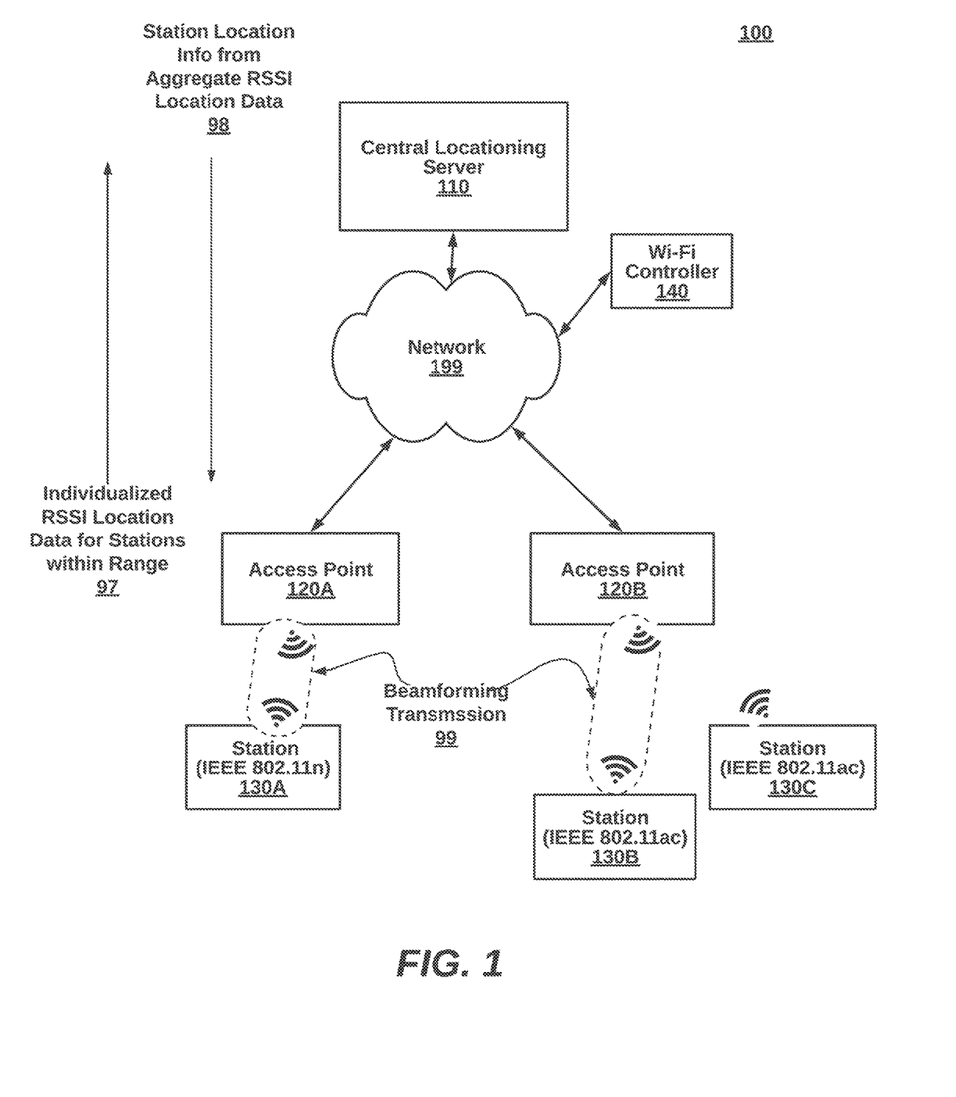
FIG. 1 is a high-level block diagram illustrating a system to provide beamforming QoS by centrally controlling real-time locationing of stations independent of beamforming capability, according to one embodiment.
Figure 2:
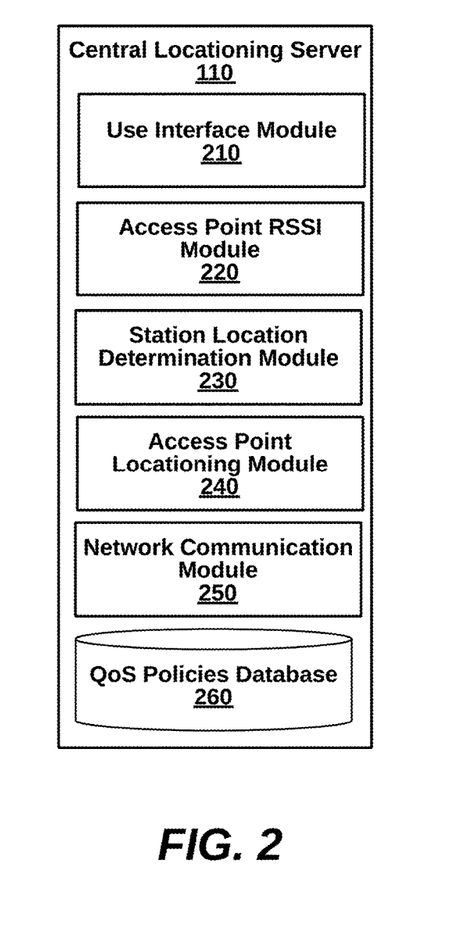
FIG. 2 are more detailed block diagrams illustrating internal components of a location monitoring server from the system of FIG. 1, according to some embodiments.
Figure 3:
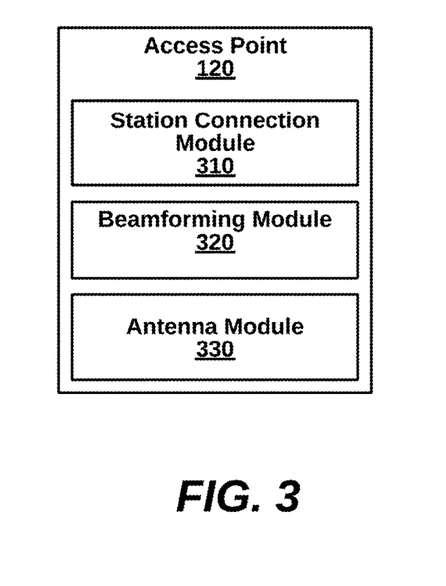
FIG. 3 is a more detailed block diagram illustrating internal components of an access point from the system of FIG. 1, according to one embodiment.

Systems for Network-Controlled Beamforming QoS (FIGS. 1-3)

FIG. 1 is a high-level block diagram illustrating a system 100 to provide beamforming QoS centrally controlling locationing for beamforming Wi-Fi transmissions to wireless stations from access points independent of beamforming capability of stations, according to one embodiment. The system 100 comprises a central locationing server 110, access points 120A-B, stations 130A-D, and LAN controller 140. Many other configurations are possible. For example, additional network components can also be part of the system 100, such as firewalls, virus scanners, routers, switches, application servers, databases, and the like.

Network 199 provides a data channel for components of the system 100 with network devices, such as routers, switches, network processors, and the like. The components can use data channel protocols, such as IEEE 802.11n, 802.11ac, or other versions of the 802.11 and other wireless standards. Referring specifically to FIG. 1, the location monitoring server 110 is coupled across the network 199 to each of the of access points, preferably over wired connections. In, turn, the access points 120A-B are coupled to the stations 130A-D, preferably over wireless connections.

The central locationing server 110 leverages a configuration of access points to determine location information needed to beamform from one of the access points to the stations (e.g., individualized RSSI location data for stations within range of an access point 97). In more detail, a single transmission by station 130B, for instance, can be heard by both access points 120A and 120B, producing two RSSI values. The RSSI for each received signal, however, is typically different unless a station is equidistant away. Circles can be drawn with diameters based on RSSI strength, from known locations, an overlapping of which shows a potential location area. Preferred embodiments have at least a third access point RSSI measurement, although many situations present only two measurements. Another embodiment retrieves RSSI signals received outside of a LAN from cooperating devices. The cooperating device can be, for example, a smartphone, a networked appliance, or the like.

The central locationing server 110 provides beamforming locationing, selectively, for any or none of three beamforming scenarios represented by the three stations 130A-C (e.g., station location information from aggregate RSSI location data 98). First, station 130A conforms to IEEE 802.11n without inherent beamforming capability, but receives beamforming transmissions using locationing information from the system 100. In one example, the station 130A belongs to a CEO or a CTO, or is a general computer logged-in by the CEO or the CTO. Many other network policies or user profile settings can determine beamforming selections. Second, station 130B conforms to IEEE 802.11ac with inherent beamforming capability, but relies upon locationing information from the system 100. Third, station 130C also conforms to IEEE 802.11ac, but does not receive beamforming transmissions compared to the station 120B because of a closeness to the access point 120B. The access point 120B can therefore conserve resources on nearby stations that already receive a high-quality SNR signal. Other configurations are possible. For instance, all stations can be IEEE 802.11ac capable stations. Many other rules, besides or in addition to, distance of a station to an access point can be implemented determine whether to provide beamforming service. In another instance, some stations are IEEE 802.11ad capable and beamform transmission signals back to the access points.

The central location of FIG. 1 is located within a LAN or remotely on the Internet cloud. When implemented within a LAN, the central locationing server 110 can be further integrated within the Wi-Fi controller 140, or have a dedicated line of communication. The central locationing server 110 is set forth in more detail below with respect to FIG. 2.

The access points 120A utilizes location information from the central locationing server 110 to direct antenna for beamforming. The location information can be identical to, similar to, or distinct from the type of location information self-reporting by stations under IEEE 802.11ac and other protocols. The location information can be determined by a network processor, in one case, having custom microcode directed to beamforming locationing. One embodiment provides a similar processor architecture in the central locationing server.

In one embodiment, the access points 120A off-load locationing and/or beamforming from a network processor to a content processor, to improve access point performance. The overhead of beamforming can be reduced with a specialized ASIC that is optimized for beamforming operations. One implementation shares locationing processing tasks with the central locationing server 110. Raw data is then locally processed by the content processor, streamed over the network to the central locationing server 110 for processing, or a combination of pre-processing locally and finish processing remotely.

Figure 6:
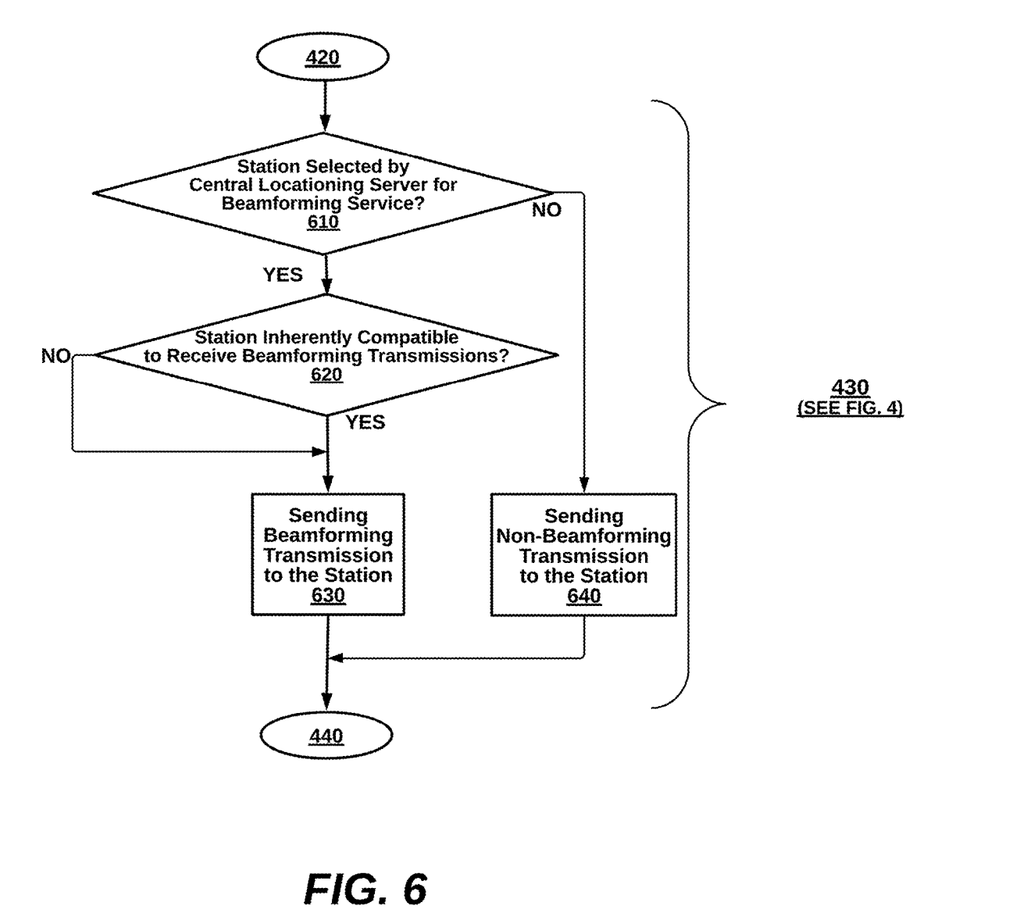
FIG. 6 is a more detailed flow diagram illustrating a step of, selecting stations for beamforming transmission amongst beamforming capable stations according to priority, from the method of FIG. 4, according to an embodiment.

The access points 120A,B physically include one or more individual access points implemented in any of the computing devices discussed herein (e.g., see FIG. 6). For example, the access points 120A,B can be an AP 110 or AP 433 (modified as discussed herein) by Fortinet of Sunnyvale, Calif. A network administrator can strategically place the access points 120A,B for optimal coverage area over a locale. The access points 120A,B can, in turn, be connected to a wired hub, switch or router connected to the enterprise network 199 (or an external network). In embodiment, access point functionality is incorporated into a switch or router. In another embodiment, the access points 120A,B are virtual devices. Further embodiments of the access points 120A,B are discussed with respect to FIG. 3.

The stations 130A-C can receive beamforming transmissions from an access point. In some embodiments, the stations 130A-C participate in beamforming by specifically configuring receiving antennae. For example, different antenna in an array can compensate for known differences in arrival time for signals. The different received signals can be combined in phase from buffers for a constructive effect on the transmission signal. In some other embodiments, stations having IEEE 802.11ad compatibility have 2-way beamforming capability for transmitting to access points making use of beamforming techniques. Some embodiments include beamforming receivers, while others do not.

Figure 7:
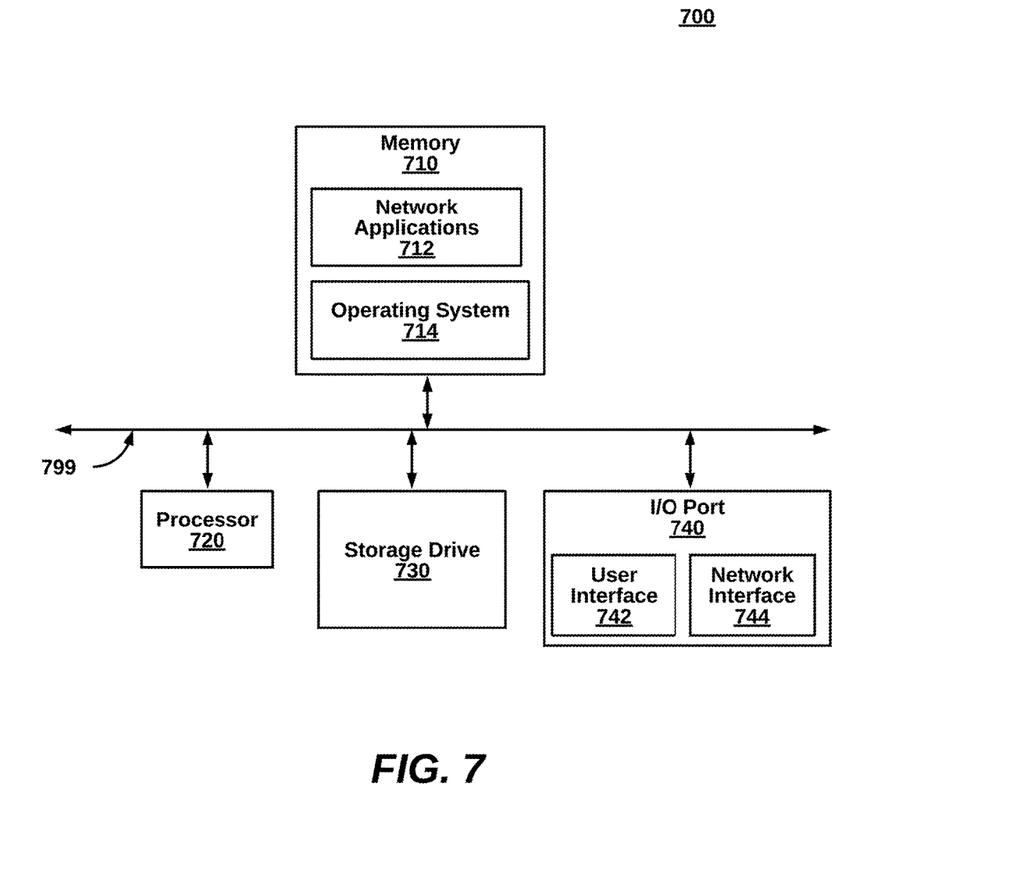
FIG. 7 is a block diagram illustrating an example computing device, according to one embodiment.

Additionally, the stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

The Wi-Fi controller 140 manages the access points 120A,B and controls stations as they traverse around the network. In one embodiment, a QoS is determined for the station 130A and continues to be the QoS when the station 130A subsequently associates with the access point 120B, for instance.

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

FIG. 2 is a more detailed block diagram illustrating the central locationing server 110 of the system 100, according to one embodiment. The central locationing server 110 comprises user interface module 210, access point RSSI module 220, station location determination module 230, access point locationing module 240, network communication module 250, and user policies database 260.

User interface module 210 can be, for example, a graphical user interface, a command line interface, or any other mechanism for providing user input and output to the central locationing server 110. User policies can be created and updated through user accounts and stored in the QoS policies database 260. Internet browsers or downloadable apps can abstract communication for users and/or network administrators. User devices can be physically connected by a serial port or radio connected over a local Wi-Fi LAN. User devices can alternatively be remotely connected to the user interface module 210 over the Internet or by VPN (virtual private network).

Access point RSSI module 220 receives raw or pre-processed data concerning RSSI measurements for stations on the network. In one embodiment, location histories for a station are stored and analyzed. When a new station associates with an access point, previously collected locationing information from RSSI is immediately available, due to the centralized perspective of the access point RSSI module 220.

In one embodiment, alternative locationing inputs to RSSI are possible. For example, active or passive tags can transmit locations in advertisement beacons modified from access point advertisement beacons. This beacon location may be input in leu of IEEE 802.11ac or IEEE 802.11ad location information and in leu of RSSI location information.

Station location determination module 230 prepares location information from RSSI data sufficient for access points to beamform to a specific station. Implementation-specific algorithms translate the RSSI measurement data to location information usable downstream by a beamforming-capable access point. The triangulation example for determining location information is discussed above. One implementation combines the beacon location with RSSI location for locationing inputs. The location information can include absolute geo-physical location or relative geo-physical location (e.g., station location relative to access point). In other cases, the location information can be very specific downstream directives to antenna arrays. Processor load balancing between local Wi-Fi and remote cloud devices can be implementation-specific.

Access point locationing module 240 converts location information to, for example, geo-location coordinates. There is a communication channel established that additional enhanced data in addition to location data needed. Additional enhanced data can include user level beamforming controls.

Network communication module 250 includes APIs, networking software and hardware ports and protocols, and radios needed to communicate with access points, stations, external databases and severs, and the like.

FIG. 3 is a more detailed block diagram illustrating an access point 120 (collectively representing the collector nodes 120A,B) of the system 100, according to one embodiment. The access point 120 comprises a station connection 310, a beamforming module 320, and an antenna module 330, along with a network processor 340 and a content processor 350. The internal components can be implemented in hardware, software, or a combination of both.

The station connection module 310 streams location data for stations from access points on the network to the central location manager 110 for analyses. Namely, RSSI signal strength received from different access points for the same station can be compared to estimate a current (or previous) location of the station. One embodiment triangulates RSSI strength signals received from two, three or more access points.

The beamforming module 320 implements any higher level or software-based beamforming operations. For example, a CLI (command level interface) or graphical interface display can be provided to users and network administrators for configuring beamforming policy. The beamforming policy at the access point 120 can be independent of, complementary to, or override beamforming policy of the central location manager 110.

The antennae module 330 comprises one or more antennae array capable of beamforming. In more detail, a digital signal processor can coordinate signaling between the antenna for the appropriate constructive signal at the appropriate distance of the station for maximum signal strength. In one embodiment, implicit beamforming determines parameters from a set of test packets sent from a station to the access point. The access point asks the station to send a predictable set of sounding frames, and then listens for these sounding frames noting when and how they are received on each distinct antenna of an array. In another embodiment, explicit beamforming feedback is received from the station and can be based on sounding frames sent from the access point to the station where they are recorded.

Figure 4:
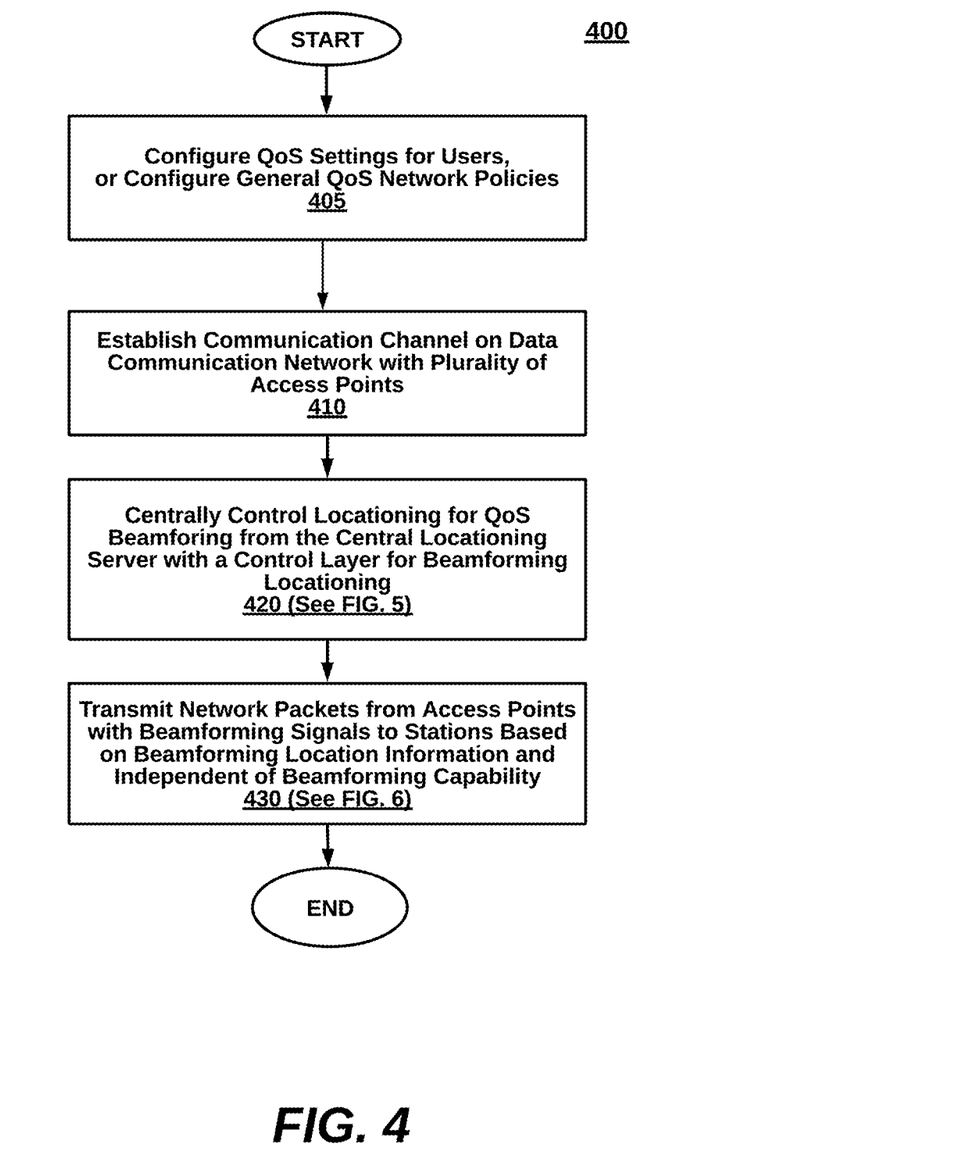
FIG. 4 is a high-level flow diagram illustrating a method for providing beamforming QoS by centrally controlling real-time locationing of stations independent of beamforming capability, according to one embodiment.
Figure 5:
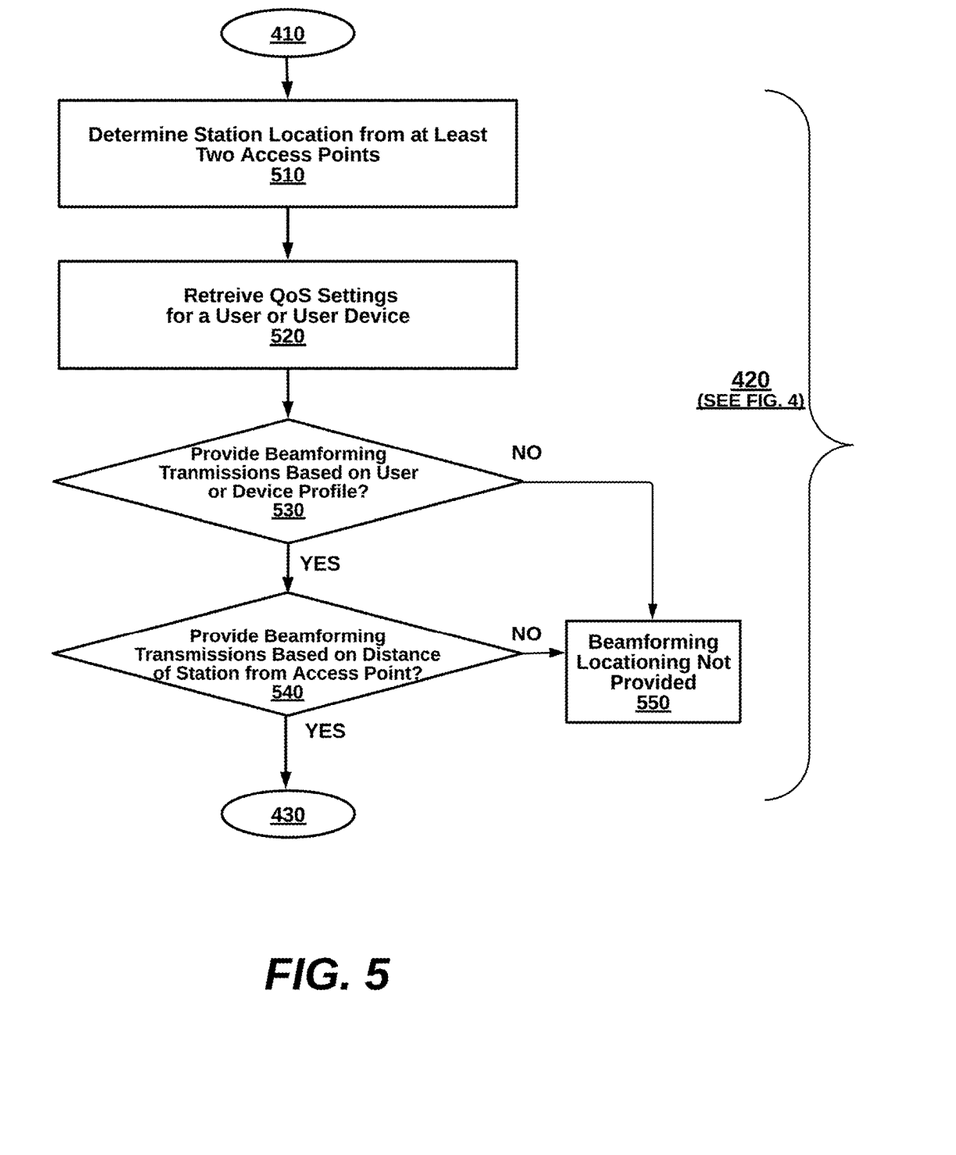
FIG. 5 is a more detailed flow diagram illustrating a step of, selecting stations for emulating beamforming transmission amongst beamforming non-capable stations according to priority, from the method of FIG. 4, according to one embodiment.

Methods for Network-Controlled Beamforming QoS (FIGS. 4-6)

FIG. 4 is a high-level flow diagram illustrating a method 400 for centrally controlling locationing for beamforming Wi-Fi transmissions to wireless stations from access points independent of beamforming capability of stations, according to one embodiment. The method 400 can be implemented by the system 100 of FIG. 1 or a different system. One of ordinary skill in the art will recognize that the method 400 is non-limiting as other embodiments can have more or less steps and can be performed in a different order.

At step 405, QoS settings for users are configured. Alternatively, of in combination with specific QoS settings, general QoS network policies can be configured. The QoS settings can be based on a service level, a subscription, a rank in an entity (e.g., CEO or CTO), or distance from an access point. For example, a nearby station will have a higher SNR due to the distance and does not need enhanced signaling of beamforming transmissions, especially if other devices do.

At step 410 communication channels are established with a plurality of access points over a data communication network. The access points, in turn, have communication channels established with a plurality of stations over a Wi-Fi portion of the data communication network.

At step 420, locationing for QoS beamforming is centrally controlled from a central locationing server. A control layer is established for beamforming locationing and the control layer provides beamforming according to a QoS of the user or the user device. The beamforming locationing determined by the network supplants any IEEE 802.11ac related locationing information, and in fact, has no reliance on this data in some embodiments. Further embodiments of the centrally controlling step 420 are discussed in FIG. 5.

At step 430, network packets are transmitted from access points with beamforming signals to stations. The transmissions are based on beamforming locationing information and are independent of beamforming capability, as described further in association in FIG. 6 below.

FIG. 5 is a more detailed flow diagram illustrating the centrally controlling QoS step 420 from the method of FIG. 5, according to one embodiment.

At step 510, station location is determined from at least two access points. At step 520, QoS settings are retrieved for a user or a user device. A network controller may have input for what type of QoS a station retrieves based on a history of connections with other access points. Further, QoS settings, once determined, can be applied at different access points as stations traverse across the network.

At step 530, if beamforming is provided based on a use profile, and at step 540, beamforming is provided based on a distance from the access point, then the transmitting network packets step 430 is performed. However, at step 530, if beamforming is not provided based on user profile, or at step 540, beamforming is not provided based on a distance form an access point, location information is not provided for beamforming, at step 550.

FIG. 6 is a more detailed flow diagram illustrating the beamforming transmissions step 430 from the method of FIG. 5, according to one embodiment.

At step 610, if a station is selected by a central locationing server for beamforming service, and the station is inherently compatible to receive beamforming transmissions (e.g., IEEE 802.11ac compatible), at step 620, then beamforming transmissions are sent to the station, at step 630. Identically, at step 620, if the station does not have inherent compatibility to receive beamforming transmissions, the transmissions can still be sent at step 630, due to the organically-determined locationing information.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the central log manager 110, the collector nodes 120, and the network devices 130A-D. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the central locationing server 110, the access points 120A,B, and the stations 130A-C, as illustrated in FIGS. 1-3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a central locationing server connected implemented at least partially in hardware and communicatively coupled to a plurality of access points which are in turn communicatively coupled to a plurality of wireless stations on a Wi-Fi portion of a data communication network, the method for determining real-time station locations to provide a beamforming quality of service to stations independent of beamforming capability, the method comprising the steps of:

establishing a communication channel on the data communication network with the plurality of access points, wherein the plurality of access points provides network access to the plurality of stations;

determining station location information for the plurality of stations from the plurality of access points, the station location information for a specific station determined by a signal strength of a signal (RSSI) as received by different access points at known locations;

determining quality of service for the specific station, wherein quality of service determines whether the specific station receives beamforming service or not, independent of beamforming capability of the specific station;

centrally controlling the location for beamforming by transmitting the beamforming location information and QoS information for the specific station to an access point servicing the specific station from the plurality of access points, wherein the access point transmits network packets with beamforming signals to the specific station based on the beamforming location information.

2. The method of claim 1, further comprising:
updating an association of the specific station with an updated access point, wherein the station comprises a mobile station; and
transmitting subsequent beamforming location information to the updated access point.

3. The method of claim 1, further comprising:
receiving time information corresponding to the location information.

4. The method of claim 1, wherein the step of determining the quality of service comprises:
upgrading the specific station to beamforming QoS, wherein the specific station does not natively support beamforming, or does not have native beamforming compatible with the access point.

5. The method of claim 1, wherein the step of determining the quality of service comprises:
downgrading the specific station to non-beamforming QoS, wherein the specific station does natively support beamforming, or does have native beamforming compatible with the access point.

6. The method of claim 1, wherein the step of determining the quality of service comprises:
maintaining the specific station at beamforming QoS, wherein the specific station does natively support beamforming, or does have native beamforming compatible with the access point.

7. The method of claim 1, wherein the step of determining the quality of service comprises:
maintaining the specific station at non-beamforming QoS, wherein the specific station does not natively support beamforming, or does not have native beamforming compatible with the access point.

8. A non-transitory computer-readable medium to, when executed by a processor, perform a computer-implemented method in a central locationing server connected implemented at least partially in hardware and communicatively coupled to a plurality of access points which are in turn communicatively coupled to a plurality of wireless stations on a Wi-Fi portion of a data communication network, for determining real-time station locations to provide a beamforming quality of service to stations independent of beamforming capability, the method comprising the steps of:

establishing a communication channel on the data communication network with the plurality of access points, wherein the plurality of access points provides network access to the plurality of stations;

determining station location information for the plurality of stations from the plurality of access points, the station location information for a specific station determined by a signal strength of a signal (RSSI) as received by different access points at known locations;

determining quality of service for the specific station, wherein quality of service determines whether the specific station receives beamforming service or not, independent of beamforming capability of the specific station;

centrally controlling the location for beamforming by transmitting the beamforming location information and QoS information for the specific station to an access point servicing the specific station from the plurality of access points, wherein the access point transmits network packets with beamforming signals to the specific station based on the beamforming location information.

* * * * *